United States Patent [19]
Walkingshaw et al.

[11] Patent Number: 5,488,423
[45] Date of Patent: Jan. 30, 1996

[54] HOME COMMUNICATION METHOD AND APPARATUS

[75] Inventors: M. Jay Walkingshaw, Wainscott, N.Y.; Lorne R. Somerville, London, Great Britain; Anthony R. Esdaile, Selsdon, Great Britain; David J. Stuart, East Grinstead, Great Britain

[73] Assignee: U.S. Narrow Networks, Inc., New York, N.Y.

[21] Appl. No.: 341,509

[22] Filed: Nov. 17, 1994

[51] Int. Cl.⁶ .......................................... H04N 7/08
[52] U.S. Cl. ............................ 348/460; 348/725; 348/473; 348/10
[58] Field of Search ..................... 348/2–13, 17, 348/460, 473, 476, 725; H04N 2/08

[56] References Cited

U.S. PATENT DOCUMENTS

| | | | |
|---|---|---|---|
| 4,745,468 | 5/1988 | Von Kohorn | 358/455 |
| 4,876,592 | 10/1989 | Von Kohorn | 358/455 |
| 4,926,255 | 6/1990 | Von Kohorn | 358/358 |
| 5,034,807 | 7/1991 | Von Kohorn | 358/358 |
| 5,057,915 | 10/1991 | Von Kohorn | 358/455 |
| 5,093,718 | 3/1992 | Hoarty et al. | 358/358 |
| 5,128,752 | 7/1992 | Von Kohorn | 358/455 |
| 5,220,420 | 6/1993 | Hoarty et al. | 358/455 |
| 5,227,874 | 7/1993 | Von Kohorn | 358/455 |
| 5,231,494 | 7/1993 | Wachob | 348/473 |
| 5,249,044 | 9/1993 | Von Kohorn | 358/455 |
| 5,285,278 | 2/1994 | Holman | 348/3 |
| 5,287,181 | 2/1994 | Holman | 348/455 |
| 5,319,453 | 6/1994 | Copriviza et al. | 348/73 |
| 5,319,455 | 6/1994 | Hoarty et al. | 348/455 |
| B1 4,745,468 | 6/1991 | Von Kohorn | 358/455 |

*Primary Examiner*—Victor R. Kostak
*Attorney, Agent, or Firm*—Brumbaugh, Graves, Donohue & Raymond

[57] ABSTRACT

Redeemable shopping coupons for products or information printouts in categories preferred by a consumer are printed in the consumer's premises when made available by a manufacturer or advertiser through the coupon and information service. Data identifying either or both product and information category and printout content are broadcast in conjunction with regular television programs and received in decoder-printer units in the homes of consumers subscribing to the service. If received product or information category data matches pre-programmed category data stored in the subscriber's unit, a printer in the unit is activated to generate a printout containing the received coupon data or other information. Operation of the subscriber's unit requires no interaction through the unit with the broadcasting service nor does operation of the unit affect operation of the subscriber's television set.

10 Claims, 2 Drawing Sheets

HOME COMMUNICATION METHOD AND APPARATUS

SPECIFICATION

1. Field of the Invention

The present invention relates to home communication systems, and, in particular, to methods and systems for directly generating selected printed information, including redeemable coupons, at consumers' premises.

2. Background of the Invention

It is a common practice for consumer product manufacturers and advertisers to issue or publish printed coupons which can be clipped and taken to a redemption center, such as a retail store, at which they are redeemed for some value or as a discount toward the purchase of the designated product. One widely used source of coupons is the free standing insert found in many Sunday newspapers. Others include newspapers and flyers, either picked up by or delivered to consumers, and coupons made available in stores themselves. While these types of coupon distributions have proven to be effective, they present a number of disadvantages to the user, as well as to the manufacturers and the advertisers.

The difficulties and inconveniences associated with the use of published coupons to be clipped by a user to both consumer and advertiser are evident. A consumer must acquire the publication, which the advertiser has the burden of distributing to both an interested and disinterested public. An interested consumer must then search through a host of such publications and cut out such coupons as he finds interesting, itself a burdensome and time-consuming task.

Furthermore, redemption of coupons at a supermarket, for example, provides little marketing information to the manufacturer or advertiser other than that the product was bought by a group of anonymous consumers and that these consumers scanned the publication, be it a newspaper or a distributed flyer. The rate of redemption of coupons is substantially low compared to the number distributed and the rudimentary geographic information gleaned from the redemption counts in the distribution areas is of limited guidance in planning future marketing programs.

Systems have been devised for enabling the printing of coupons at supermarket checkout counters to target a consumer's specific shopping preferences. Thus, for example, a consumer's purchase of a particular type of dry breakfast cereal, as detected by the checkout scanner, would trigger a coupon printing apparatus to print a coupon for a discount on a competitor's dry cereal product, or perhaps a different cereal product of the same manufacturer. Since the coupon is issued at checkout, the consumer is required to make a return trip to the supermarket to redeem it. Moreover, such systems do not provide the manufacturer or advertiser with information concerning the consumer himself.

In efforts to remedy the shortcomings of such coupon distribution schemes, techniques have been devised for employing interactive television systems to enable a consumer to view information about products for which coupons are available, select those that are of interest and have coupons printed in the home. U.S. Pat. No. 5,287,181, granted Feb. 15, 1994, discloses one such system using coupon-related data encoded on a television broadcast signal. A viewer is informed that such information is being broadcast by a logo or emblem presented in a corner of the television screen. If the viewer is interested in seeing the related product information, he actuates a decoder unit at the television set to cause the information to be displayed, whereupon the viewer can decide whether or not the offered coupon is desired. If so, further actuation of the decoder unit by the viewer stores the coupon data which can later be printed out by the viewer. Other systems of this same general type are shown, for example, in U.S. Pat. Nos. 5,128,752, granted Jul.7, 1992, and 5,249,044, granted Sep. 28, 1993.

As noted above, these prior art systems are interactive, that is, they require direct viewer input in response to displayed product information, to actuate the subscriber's unit to print a coupon. Such systems necessarily require relatively complex units to enable the interactive operation and, in some embodiments, modification of the subscriber' television sets or the cable television reception and decoding equipment. The interactive technique characterizing these systems necessitates that the subscriber view information describing the available coupons and make selections of the desired coupons, thereby requiring a conscious allocation of time and effort.

SUMMARY OF THE INVENTION

It is an object of the present invention to provide methods and apparatus for enabling the printing of redeemable coupons or other informational matter in a consumer's home, without interactive participation by the consumer.

Another object of the invention is to provide such methods and apparatus wherein the consumer receives coupons or other printed matter only for categories of products or types of information preselected by the consumer and in which the consumer need not be present to obtain the coupons or printed matter.

A still further object of the invention is to provide such a system in which coupon or other information is incorporated in radio or television broadcasts and subscribers are provided with simple, inexpensive receiving units which detect the coupon or other information and provide the preselected coupons or other printed matter.

These objects are attained according to the invention by incorporating coupon data or other information in radio or television broadcast signals which are received by decoder-printer units at the subscribers' homes. The decoder unit is programmed with data identifying the consumer's preselected product or information categories of interest. The broadcast station or stations transmit, along with their regular program material, either or both product manufacturers' coupon information, including product category identifying data, and information, including information category identifying data, in various categories, such as weather, financial market data, etc. that subscribers may wish to receive in printed form. All the coupon or other information is received at each subscriber's decoder printer unit, but only when a received product or information category identifier matches the pre-programmed product or information category identifying data previously stored in the subscriber's unit, will the printer be activated to provide a suitable printout.

Preprogramming of a subscriber's unit is effected at the couponing service's central station, based on information received from the subscriber at the time of subscription. A completed questionnaire specifying the subscriber's product and/or information category preferences and relevant personal data is submitted to the couponing service with the subscription request. Upon acceptance, the subscriber is supplied with a decoder-printer unit which may be preprogrammed and which may be readily connected to the subscriber's antenna or cable input, without interfering with normal radio or television reception. Programming of a subscriber's unit may be changed from the central station.

The coupon printed by the subscriber's unit includes product identifying information, in both human and machine readable form, e.g., bar code, and a unique identifying code assigned to the subscriber. The latter facilitates tracking of subscriber usage. Other messages, e.g., product tips, recipes, etc., may also be imprinted on the coupons for the convenience of the subscriber. For information subscribers, the printout can be in the form of text, charts, maps, etc.

Operation of the decoder-printing unit requires no subscriber intervention, other than connecting the unit to receive the broadcast signal and replenishing printer paper.

BRIEF DESCRIPTION OF THE DRAWINGS

For a better understanding of the invention, reference will be made, by way of example, to the accompanying drawings in which.

DETAILED DESCRIPTION

The present invention will be described below with reference to television broadcast signals, however, it should be understood that the principles of the invention are applicable to radio broadcast signals, satellite broadcast and closed circuit systems, as well. Moreover, the ensuing description will be directed to the invention's application to redeemable coupons, but it will be understood that the same principles and operation apply to the provision of information printouts.

Figure 1:
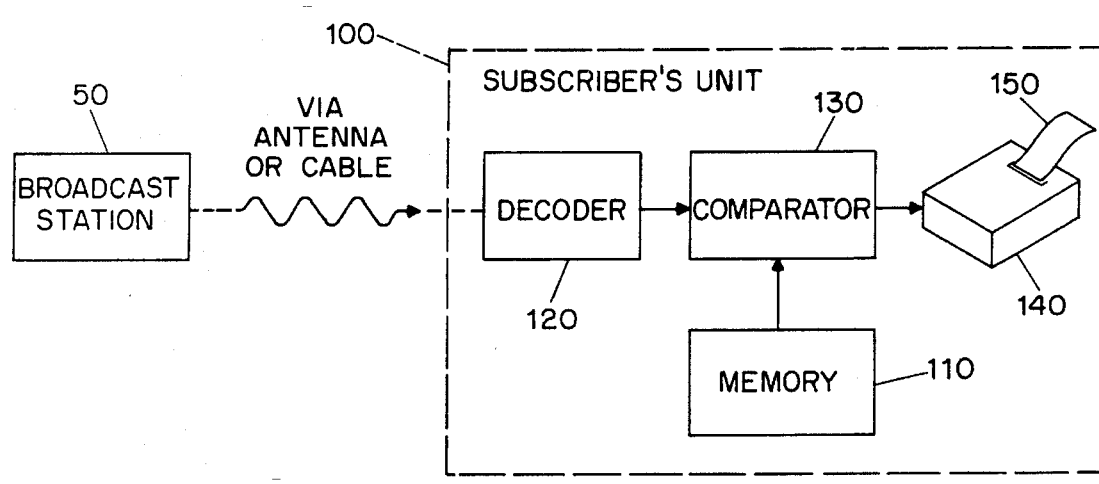
FIG. 1 is a block diagram of the overall system according to the present invention.

The overall system according to the invention is illustrated in FIG. 1. A television broadcast station 50 serving a reception area transmits its program material, via antenna or cable, to its audience. Embedded in the broadcast television signal so as not to be normally visible on the viewer's screen, are data signals representing redeemable coupons and related information that product advertisers wish to distribute to interested members of the audience through the home couponing service. Included in these data signals is coupon category information which describes the redeemable coupons to enable the subscriber's decoder-printing units 100 to select individual coupons from a series of broadcast coupons. The data signals also include data management information used to reprogram decoder-printing units, individually or in groups, from the central station of the service. One known technique to effect such transmission is to insert the signals into television picture lines at the top or bottom of the raster which are not visually reproduced on the television screen.

Subscribers to the home couponing service will have been provided with decoder-printing units 100, pre-programmed with the particular product categories in which the subscriber is interested. Category information is stored in memory 110 in the unit 100. Decoder 120 extracts from television broadcast signals all product category and coupon data being transmitted and presents them to a comparator 130, where the product category data are compared with the pre-selected category data stored in memory 110. If the decoded product category data corresponds to a category in memory 110, the coupon printer 140 is actuated to print a coupon 150 in accordance with the decoded coupon data.

Figure 1A:
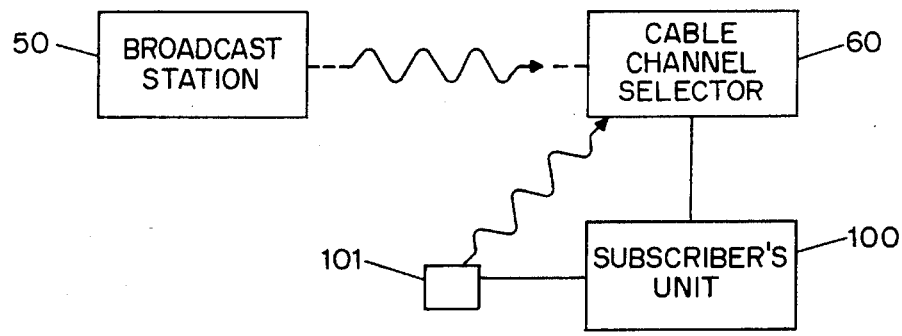
FIG. 1A is a block diagram of a modification of the overall system of FIG. 1.

When applied to cable systems, the decoder unit memory may also be pre-programmed with cable channel information and the unit 100 provided with an infra-red transmitter 101 for communication with the subscriber's cable box 60, as shown in FIG. 1A. Channel selection information is transmitted from the broadcast station 50 in the usual manner, decoded and compared with the stored cable channel information to generate the local cable channel selection signals. These are then transmitted by the infrared transmitter 101 to the cable box to tune the latter to the proper channel for the ensuing coupon or information signal broadcast.

At the time of or subsequent to subscribing to the couponing service, a subscriber may submit to the central station of the service, a completed questionnaire identifying product categories in which he or she is interested, along with demographic information. This may also be done by telephone. The subscriber is then provided with the unit 100, which may be pre-programmed with the selected product categories in its memory, or may be programmed or updated through the television broadcast, and instructions for connecting the unit to the television signal input. Suitable connections are provided on the unit so that it will not affect normal usage of the subscriber's television set. Coupons offered in the selected categories will then be printed by the unit without any further attention of the subscriber (except to periodically replenish the paper supply). The subscriber's television receiver need not be on for the unit to print the selected coupons and the subscriber is not required to watch television broadcasts to make coupon selections.

The subscriber's unit 100 has its own power supply, either battery or by connection to a standard electrical outlet.

Figure 2:
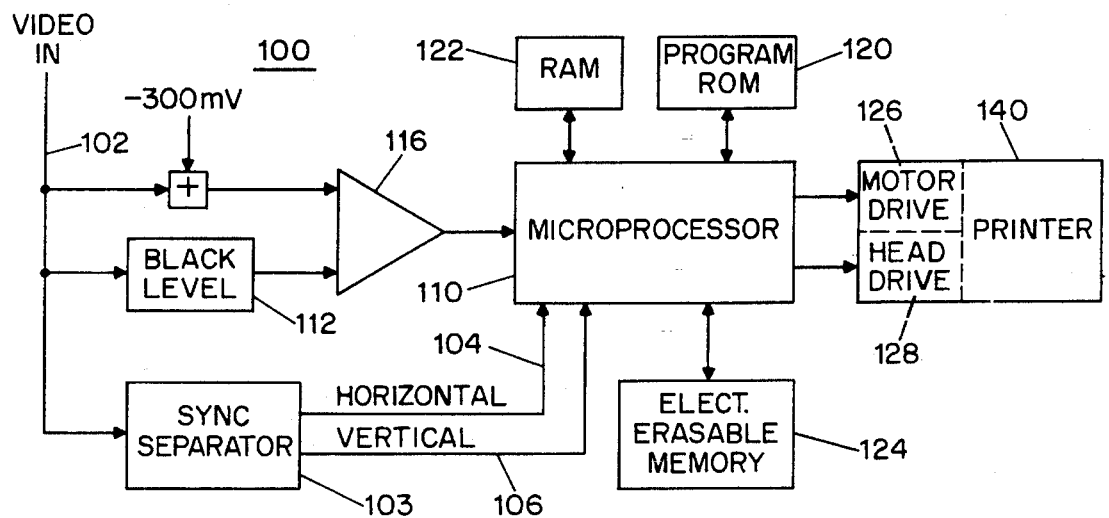
FIG. 2 is a block diagram of the decoder-printer unit.

The decoder-printer unit 100 of the invention is shown in greater detail in FIG. 2. The received video signal is fed via line 102 to sync separator 103 to produce a horizontal pulse corresponding to the start of each video line on conductor 104 and a vertical pulse on conductor 106 corresponding to the start of each video field. The horizontal and vertical pulses are supplied to microprocessor 110 which uses them to identify each video line by number. Microprocessor 110 may be, for example, an Intel 8051 or similar device.

The received video signal also is supplied to black level store 112 to produce a black level signal corresponding to the black part of the video picture. The video signal is also fed to voltage adder 114 which adds a 300mV negative offset voltage to the video signal. The resultant offset video signal and the black level signal are then combined in voltage comparator 116 which compares the two signals to determine the polarity of the recovered data logic levels. The output of the comparator, therefore, recovers serial data which has been encoded and then inserted into the video signal at the transmitting station. This serial data is fed to microprocessor serial input port 118.

The serial data supplied to the microprocessor contains the product category identifying data, the coupon information, including category information and decoder-printer management information, in the form of data packets. The coupon information includes data packets, in compressed or uncompressed form, of the elements of a coupon, namely the product logo, the coupon body, and a series of barcodes used to identify the coupon and the user. Other information, e.g., product tips, recipes, etc., may also be included.

The software for operating microprocessor 110 is stored in ROM 120. Upon receipt of serial data constituting the product category identifier and the coupon information, the microprocessor stores the data in RAM 122. Data representing the product categories selected by the subscriber are stored in electrically erasable ROM (EEROM) 124.

Upon detection of the product category and coupon information data from the received signal, microprocessor 110 compares the product category data with the subscriber's product category data stored in EEROM 124. If there is a match, the microprocessor actuates the printer motor drive 126 and print head 128 in accordance with the coupon information from RAM 122 to print the coupon. This process is repeated each time a match is found between subscriber product category data in EEROM 124 and received product category data. If no match between a received product category data and subscriber product category data is present, the unused coupon information data is deleted from RAM 122.

If desired, the preselected information stored in EEROM 124 may include a code sequence uniquely identifying the subscriber. This provides security for the system and enables the central station to communicate with a specific subscriber's unit, such as would be required to remotely change the product categories stored in EEROM 124.

The printer 140 may be a conventional thermal dot-matrix printer of the type commonly used in calculators and similar equipment, such as the Panasonic EPT 2014 S2 LG 2 -inch 144 dot graphic printer, but any other printer, compatible with the size requirements of the unit, may be used.

Figure 3:
FIG. 3 is a sample coupon generated by the decoder-printer unit.

A typical coupon 150 produced in accordance with the invention is illustrated in FIG. 3. The coupon may include product identifying information, such as a logo, imprinted on it, along with identification of the product manufacturer, validity period, offer terms, UPC code of the product and other message information as shown. In addition, as an aid to market analysis, information, preferably in the form of a bar code, identifying the subscriber by address, family members, etc. may be included.

In the case of an information subscription, the printout may simply be text incorporating the desired information or may include, e.g. weather maps, charts, etc. It will be understood that an individual subscriber may wish to receive both redeemable coupons in selected product categories and information printouts in selected information categories and as can be seen, the invention is effective to provide such a mix, as desired.

Although at the time of subscription to the service, the subscriber may be furnished with the unit 100 programmed with his preselected product or information categories, it is expected that the subscriber's preferences may vary over time. In such a case, existing category data in the EEROM 124 (FIG. 2) may be erased and new category data may be entered remotely from the central facility by causing appropriate data to be transmitted with a television broadcast. Inclusion of subscriber identification data in the transmitted signal insures that only the unit of the subscriber requesting the change is supplied with the category data revisions. In addition, the subscriber may optionally be given the capability to enter certain category data or management data himself.

The simplicity of the circuit arrangement enables its assembly in a small, rugged package, unobtrusive in the subscriber's home and lending itself to shipping to subscribers by mail or ordinary courier services.

It will be understood that the invention as described above may be modified in various respects by those skilled in the art and that the invention is to be limited only as set forth in the appended claims.

We claim:

1. A non-interactive method for providing coupon and information printouts to a consumer in the consumer's premises wherein either or both coupon and information data is embedded in program broadcast signals, said method comprising the steps of providing a consumer with means for detecting coupon and information data embedded in received broadcast signals, means for storing data identifying selected product and information categories desired by the consumer, and printing means, receiving broadcast signals with embedded coupon and information data at said consumer's location, detecting said coupon and information data from said received broadcast signals, comparing the detected coupon and information data with data identifying selected product and information categories previously stored at the consumer's location, and actuating said printing means to provide printouts of coupons and information upon correspondence of said selected product and information categories with the product and information categories of the detected coupon and information data.

2. The method of claim 1 wherein the coupon and information data is embedded in the video signal of a television broadcast.

3. The method of claim 1 wherein said program broadcast signals including embedded coupon and information data is received by a plurality of consumers and wherein each consumer is provided with said detecting, storing and printing means, the storing means of each consumer having stored therein data identifying product and information categories selected by said consumer.

4. The method of claim 3, further comprising the steps of assigning each consumer a unique identification signal, storing said unique identification signal in said storing means, and detecting said unique identifier signal embedded in program broadcast signals to enable communication with a particular consumer.

5. The method of claim 4 further comprising the step of effecting changes of product and information category information in said particular consumer's storing means by means of change data embedded in broadcast signals detected by said consumer.

6. Non-interactive apparatus for generating either or both coupons and information printouts at a consumer's premises from coupon and information data embedded in broadcast program signals comprising:

data storage means for storing data identifying product and information categories selected by the consumer, decoder means for detecting coupon and information data embedded in broadcast program signals, means for supplying broadcast program signals to said decoder means, comparison means for comparing the product and information category data in said data storage means with coupon and information category data detected by said decoder means from received broadcast program signals, and printer means responsive to correspondence between said stored product and information category data and product and information categories of said detected product and information data to provide printouts of coupons and information in the categories selected by the consumer.

7. The apparatus of claim 6 wherein said comparison means is a microprocessor.

8. The apparatus of claim 6 wherein said data storage means comprises an electronically erasable memory.

9. The apparatus of claim 6 further comprising connector means for coupling said decoder means to a source of broadcast program signals.

10. The apparatus of claim 9 wherein said coupon and information data is embedded in selected picture lines of the video portion of a television broadcast signal and said decoder means detects said data from said selected picture lines.

* * * * *